United States Patent
Srivastava

(10) Patent No.: US 7,698,656 B2
(45) Date of Patent: Apr. 13, 2010

(54) METHODS, APPARATUS AND COMPUTER PROGRAMS SUPPORTING SHORTCUTS ACROSS A PLURALITY OF DEVICES

(75) Inventor: Biplav Srivastava, Noida (IN)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 10/902,197

(22) Filed: Jul. 29, 2004

(65) Prior Publication Data

US 2006/0026572 A1 Feb. 2, 2006

(51) Int. Cl.
*G06F 3/048* (2006.01)
*G06F 9/45* (2006.01)

(52) U.S. Cl. .................. 715/827; 715/847; 717/136

(58) Field of Classification Search ........... 715/847, 715/827

See application file for complete search history.

(56) References Cited

U.S. PATENT DOCUMENTS

| | | | |
|---|---|---|---|
| 5,864,605 A | | 1/1999 | Keshav |
| 5,877,765 A | | 3/1999 | Dickman et al. |
| 6,091,409 A | | 7/2000 | Dickman et al. |
| 6,820,075 B2 * | 11/2004 | Shanahan et al. ........... 707/3 |
| 7,032,185 B1 * | 4/2006 | Yohanan ................. 715/847 |
| 2002/0091527 A1 * | 7/2002 | Shiau ................. 704/270.1 |
| 2002/0174177 A1 * | 11/2002 | Miesen et al. ............ 709/203 |

OTHER PUBLICATIONS http://web.archive.org/web/20031210100532/http://www.w3schools.com/xforms/xforms_intro.asp, published in Web archive by W3schools on Dec. 10, 2003.*
'Xforms 1.0', W3C Recommendation, Oct. 14, 2003, World Wide Web Consortium, M. Dubkinko, L.L. Klotz, R. Merrick and T.V. Raman (editors), 2003, Section 4 (downloaded from www.s3.org/TR/2003/REC-xforms-20031014 on Jun. 21, 2004).

* cited by examiner

*Primary Examiner*—William L Bashore
*Assistant Examiner*—Henry Orr
(74) *Attorney, Agent, or Firm*—Gibb I.P. Law Firm, LLC

(57) ABSTRACT

Provided are methods, computer programs and apparatus supporting use of generic shortcuts. Generic shortcut sequences are sequences of generic inputs that are defined to an application program to initiate specific operations of the application, and which translate to a respective input sequence receivable from each of a plurality of different types of input device. An application program written to support generic shortcut sequences will initiate specific application operations when received device-specific inputs translate into a sequence of generic inputs and the sequence includes a generic shortcut sequence. An event translator applies mappings between receivable device-type-specific inputs and respective generic inputs, to allow received input sequences to be translated into sequences of generic inputs. The resulting sequences of generic inputs are compared with defined generic shortcut sequences. If a match is identified between the sequence of generic inputs (generated by translating received device-specific inputs) and a defined generic shortcut sequence, the generic shortcut sequence initiates its respective application operation.

6 Claims, 6 Drawing Sheets

PRIOR ART

METHODS, APPARATUS AND COMPUTER PROGRAMS SUPPORTING SHORTCUTS ACROSS A PLURALITY OF DEVICES

FIELD OF INVENTION

The present invention relates to methods, apparatus and computer programs supporting shortcuts that can be used across a plurality of devices.

BACKGROUND

Application programs written for 'pervasive' computing environments may be used by a number of different types of computing devices. The different computing devices may use different types of input devices such as a microphone (or other speech input), a mouse, a keypad or a keyboard. Not all devices have the same capabilities or are usable in the same manner. For example, a microphone and a mouse do not have keys, while a keypad does not have a "mute" feature. Even when similar capabilities are available, they may be reduced. For example, a keypad on a telephone does not directly have alphabetic keys.

Shortcuts are abbreviated input sequences that are defined to perform the same action as an application interaction sequence (typically a longer input sequence). If an original, formal input sequence is long or complex, a shortcut can provide an efficient and convenient alternative. Shortcuts may be implemented using application elements such as macros, voice prompts, icons or hot keys (combinations of keys of a computer keyboard that can be pressed together to efficiently initiate an operation). A shortcut input sequence via a keyboard may begin with a designated input such as the Ctrl key, Alt key or a function key (F1 to F12). Shortcuts have been found to be very useful in conventional data processing applications.

For example, the Ctrl-S ("Control" followed by "S") sequence can be used to save a document in many application programs written for a Windows™ operating system. In Web applications, where shortcuts can be macros for navigation sequences across multiple pages, the sequence Alt-O may be used for "login using default account information in wallet and order products already in the shopping cart".

However, shortcuts are typically defined with respect to a single input device and are usable only for that type of device. Therefore, if an application program can receive inputs from multiple devices (such as a mouse, keyboard and voice input via a microphone), the application developer must decide whether or not to implement shortcut support for each device type. Faced with the task of providing multiple device-type-specific shortcuts to enable each input device to initiate the same application feature, such as saving a file, developers may decide to omit shortcut support for many device types.

U.S. Pat. No. 6,091,409 describes Internet 'shortcut objects' encapsulating location information (such as a URL) and represented by Windows™ desktop icons. The objects can be opened by a number of different user operations that activate the Web Browser—such as positioning the mouse cursor over the icon and pressing mouse buttons or via menu selection (File and then Open). However, U.S. Pat. No. 6,091, 409 and related patent U.S. Pat. No. 5,877,765 do not disclose generic or device-independent shortcuts.

U.S. Pat. No. 5,864,605 describes voice menu optimization using 'shortcuts'. A shortcut message in a voice menu prompts a caller to select a shortcut button that initiates an action. The shortcut button corresponds to a sequence of a plurality of dialling buttons. U.S. Pat. No. 5,864,605 does not disclose generic or device-independent shortcuts.

When developing application programs that need to accept input from a plurality of input device types (e.g. for pervasive computing environments), a generic application model and platform-independent language may be used, such as XForms. XForms is described in the W3C's 'XForms 1.0' Recommendation of 14 Oct. 2003 (at the time of writing, this specification is available at Website URL: 'www.w3.org/TR/2003/REC-xforms-20031014/'). An XForms application includes three separate elements: a device-independent XML form definition comprising a set of form controls describing what the form does; a separate interface description section describing how the form is to be presented; and XML instance data. The generic model can be translated into a number of different versions of the application, which each take account of the capabilities of a particular input device type. For example, a first application version may be provided for invocation by a Web Browser supporting XHTML, and a second version for invocation from a WML-compliant mobile telephone. A goal of XForms is to support Browsers on different types of device (hand-held devices, televisions and desktop computers). However, XForms does not provide support for reusable shortcuts across devices.

SUMMARY

Embodiments of the invention provide methods, computer programs and apparatus supporting use of generic shortcuts that can be initiated via a plurality of different types of input device.

In a first embodiment of the invention, an application program is responsive to generic shortcut sequences to initiate application operations (such as an application navigation sequence, an operation that processes data, or another action). An event translator applies mappings between receivable device-type-specific inputs and respective generic inputs, translating received device-type-specific input sequences into sequences of generic inputs. The resulting sequences of generic inputs are then compared with a stored set of generic shortcut sequences that have each been defined to initiate specific operations (actions or a navigation sequence) within the application program. If the comparison determines that a generated sequence of generic inputs matches a defined generic shortcut sequence, the corresponding application operation is initiated. The application program may implement the comparison with defined generic shortcut sequences.

As is known in the art, a 'shortcut' sequence is an abbreviated sequence of inputs defined to initiate an operation of a computer program. In the context of the present specification, 'shortcuts' may be directly interpretable by the relevant application programs. Alternatively, the shortcuts may be simplified representations of associated sequences of inputs—and the sequence that maps to a shortcut is interpretable by the computer program as an operation initiation sequence.

In the context of the present invention, the term 'generic shortcut sequence' refers to a shortcut sequence that maps to a respective input sequence receivable from each of a plurality of different types of input device. 'Generic shortcuts' according to the invention may be universal, device-independent shortcuts that can be mapped to device-type-specific inputs from all types of input device. However, the term 'generic shortcuts' may also refer to shortcuts that can be mapped to inputs from certain classes of input device but not all classes of device.

In one embodiment, the application program itself compares a generated sequence of generic inputs with known generic shortcut sequences, and expands any identified generic shortcut sequences to generate a corresponding longer sequence of generic inputs. The application then processes the expanded sequence of generic inputs.

A second embodiment provides a pre-processor separate from the application program. The pre-processor stores shortcuts to enable matching and expansion of shortcut sequences at runtime. The pre-processor replaces an identified shortcut sequence with an expanded sequence of generic inputs, and the applications receive only the expanded input sequence. In such an embodiment, the applications themselves only receive the expanded sequence and do not need to be responsive to shortcuts. Event translation, comparison to identify shortcuts, and expansion of shortcuts may all be functions implemented in the pre-processor.

In yet another embodiment, an application program is coded to respond directly to certain shortcut sequences—without the need for expansion of a generic shortcut sequence into a longer sequence. In such an embodiment, an event translator (implemented in a pre-processor or within the application) translates received inputs to generic inputs and then the application program is able to identify any generic shortcut sequence corresponding to the received inputs.

By enabling use of generic shortcut sequences, embodiments of the present invention provide the usability advantages of shortcuts to applications that are designed to receive inputs from a plurality of input device types, without requiring application developers to implement a separate device-specific shortcut for every possible type of input device. This approach avoids having to modify the application program for each new input device.

A further embodiment of the invention provides a data processing apparatus. The apparatus includes a data storage unit for storing mappings between inputs receivable by the apparatus and generic inputs, and an application program. The apparatus also includes an event translator for applying the stored mappings to translate a sequence of inputs received by the apparatus into a sequence of corresponding generic inputs. The apparatus also includes a shortcut identifier for comparing the sequence of corresponding generic inputs with a set of generic shortcut sequences to identify a match. The generic shortcut sequences are defined to initiate respective operations of the application program. The shortcut identifier may be implemented within the application program or within a pre-processor. The application program or pre-processor may replace an identified shortcut sequence with an expanded sequence of generic inputs. The application processes the matched generic shortcut sequence or the corresponding expanded sequence to initiate the operation (action or application navigation sequence) defined for the matched generic shortcut sequence. The event translator may be implemented as a feature of a pre-processor.

The above-described methods, event translators, shortcut identifiers and pre-processors may be implemented in computer program code, available as program products in which the program code is recorded on a recording medium or is available for transfer via a data transfer mechanism.

A further embodiment of the invention provides a method for implementing generic shortcut support for an application program. The method includes the step of defining, for the application program, a set of generic shortcut sequences comprising sequences of generic inputs to which the application program can respond to initiate specific operations. The method also includes defining mappings between inputs receivable by a data processing apparatus and generic inputs. An event translator is provided to apply the mappings to translate a sequence of received inputs into a sequence of generic inputs.

A further embodiment comprises a computer program product supporting application development. The toolkit may provide support for defining generic shortcut sequences for recognition by an application developed using the toolkit. The toolkit may also—or alternatively—provide a shortcut pre-processor so that applications developed using the toolkit do not need to be coded to recognize shortcuts.

BRIEF DESCRIPTION OF DRAWINGS

Embodiments of the invention are described below in more detail, by way of example, with reference to the accompanying drawings in which.

DETAILED DESCRIPTION OF EMBODIMENTS

Figure 1:
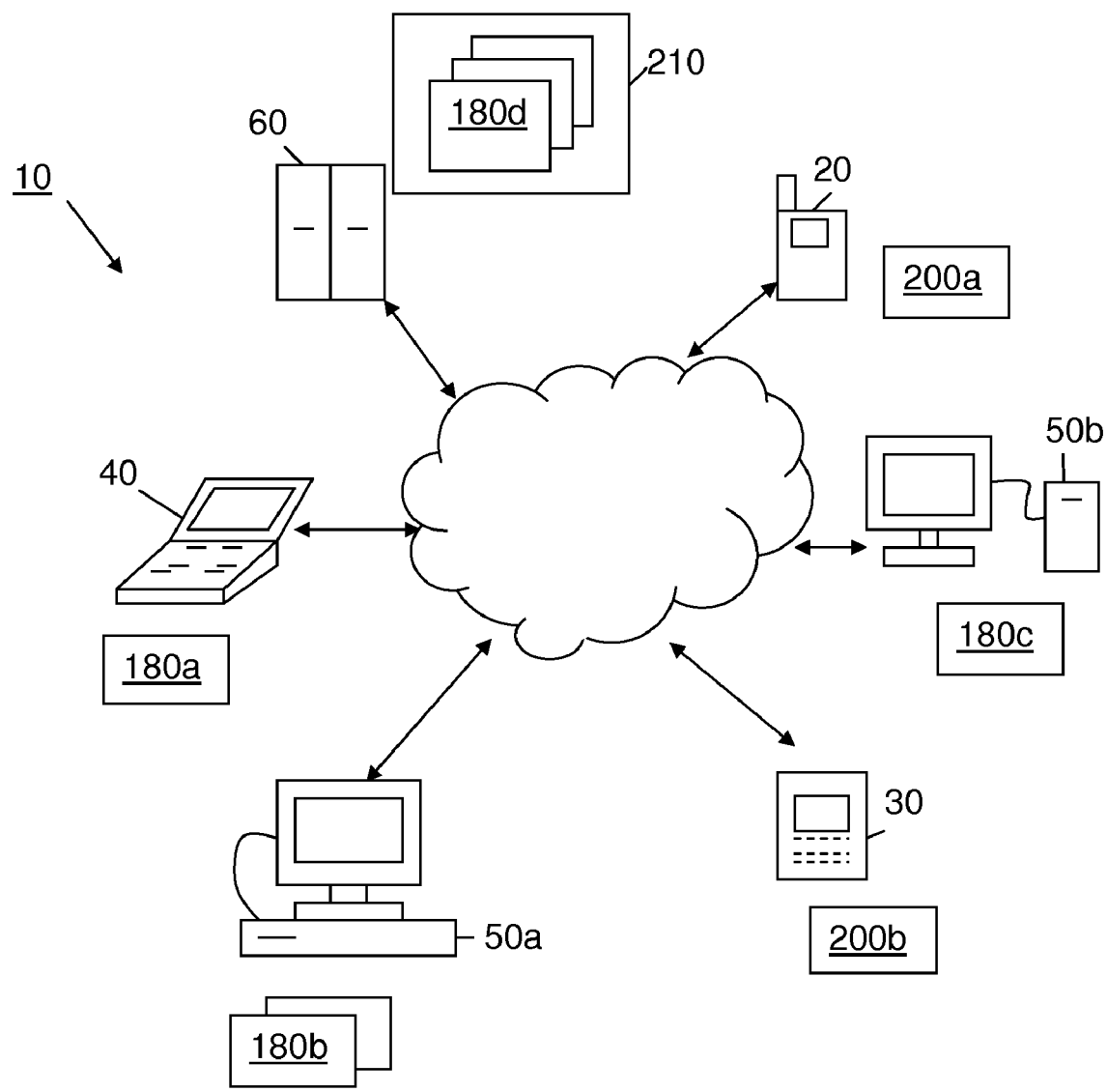
FIG. 1 shows a distributed network of data processing and communication devices, in which different types of input device may initiate operations of local and remote application programs.

It will be apparent to a person skilled in the art that individual steps of the methods described below can be performed under the control of computer program code and that a variety of programming languages and coding implementations may be used to implement the methods and components described herein. Such computer programs are not intended to be limited to the specific example control flows described below, and steps described as if performed sequentially may be performed in parallel (and vice versa). One or more of the operations described in the context of a computer-program-controlled implementation could alternatively be performed by a hardware electronics component.

Some portions of the following description refer to 'routines' (computer program implemented algorithms) for performing operations on data within a computer memory. An algorithm or program code routine is a self-consistent sequence of steps leading to a desired result. The steps are those requiring physical manipulations of physical quantities. Usually, these quantities take the form of electrical or magnetic signals capable of being stored, transferred, combined, compared, and otherwise manipulated. It is frequently convenient to refer to these signals as bits, values, elements, characters, numbers, or the like. It should be borne in mind, however, that the above and similar terms are to be associated with the appropriate physical quantities and are merely convenient labels applied to these quantities. Unless specifically stated otherwise, discussions within the present specification utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers, or other such information storage, transmission or display devices.

The present specification also discloses apparatus for performing the operations of the methods, including components of an event pre-processor and application programs adapted to implement generic shortcut support. Apparatus for implementing the invention may be specially constructed for the required purposes, or may comprise one or more general purpose computers or other devices selectively activated or reconfigured by computer programs stored in the computers or devices. The algorithms and methods described below are not inherently related to any particular computer hardware or other hardware apparatus. Various general purpose machines may be used with programs in accordance with the teachings herein.

In addition, the present specification discloses a computer readable medium for storing a computer program for performing the operations of the methods. References herein to a computer readable medium are intended to include any transmission medium for communicating the computer program between a source and a destination. The transmission medium may include storage devices such as magnetic or optical disks, memory chips, or other storage devices suitable for interfacing with a general purpose computer. The transmission medium may also include a hard-wired medium such as exemplified by typical Internet-connected server computers, or a wireless medium such as exemplified in the GSM mobile telephone system.

Where steps or features in any of the accompanying drawings are referenced by the same reference numerals, those steps and/or features have the same or similar functions or operations in the context of the present description.

FIG. 1 is a schematic representation of a network 10 of data processing devices that may each be running local application programs 180 and/or using local client programs 200 to connect to remote data processing systems 60 to initiate application operations. The various devices within the network may include any data processing device, such as mobile telephones 20, PDAs 30, laptop computers 40 and desktop computers 50, in-vehicle computers and other embedded computing devices, as well as server computers 60 running application servers 210 and Web servers. Some of the connected devices may rely on wired connections whereas others use wireless connections to the network. The network may be a wide area data processing network such as the Internet or an intranet, a local area network or a telephone or other communications network.

Application programs are computer programs performing specific functions directly for an end user (or in some cases for another application). Examples of application programs are Web Browsers, word processors, e-mail and other communication programs, spreadsheet and accounting programs, drawing and image editing programs. Applications use the services of the operating system (or other run-time environment) of the data processing device on which they run.

Most application developers attempt to provide application programs that avoid unnecessary complexity for end users, performing their operations with a minimum number of required user interaction steps. Firstly, this applies to program navigation sequences for navigating through and controlling operations of the applications. Secondly, as described above, shortcut sequences are often provided to achieve the navigation sequence in response to a simple, quick user input sequence. Shortcuts have been found to significantly improve usability of conventional application programs.

An application developer wishing to provide support for shortcuts on a desktop computer may define a sequence of keyboard actions, such as 'Ctrl-S', that can be used to initiate saving of a document in a word processing application, and various uses of function keys F1 to F12. Icons on the computer's display screen, that are responsive to user selections via a mouse pointer and mouse buttons, provide another form of shortcut.

Shortcuts have the potential to be especially helpful in pervasive environments, where there is often a requirement to minimize the steps required by a user to perform an operation. This requirement arises because of the range of devices that have limited display screens or lack a keyboard, as well as user's demands for speed and ease of use.

A generic application model and platform-independent programming language may be used to develop application programs for pervasive environments in which a single application program may receive input from several different types of data processing device. The World Wide Web Consortium's (W3C's) recommendation 'XForms 1.0' specification describes such a model using the extensible Markup Language (XML). An application developed for a number of different devices using XForms will typically have different implementation versions for the different devices. The developer may provide support for shortcuts, but this will involve defining shortcuts separately for each input device and so shortcuts are not always implemented. A version of the application program has to be modified each time a developer decides to add shortcut support for a new input device type, and this discourages provision of comprehensive shortcut support.

Figure 2:
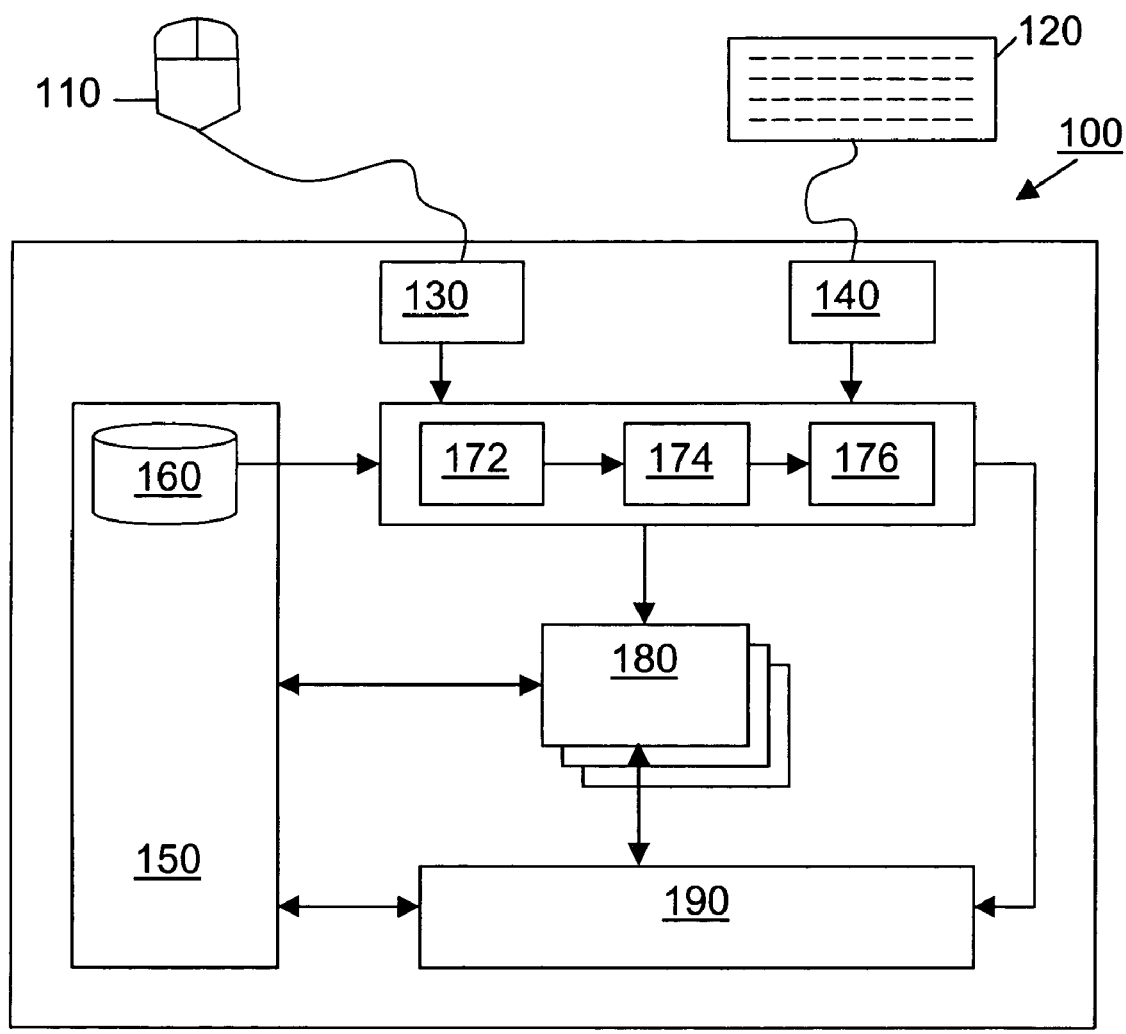
FIG. 2 is a schematic representation of components of a data processing device according to an embodiment of the invention.
Figure 4:
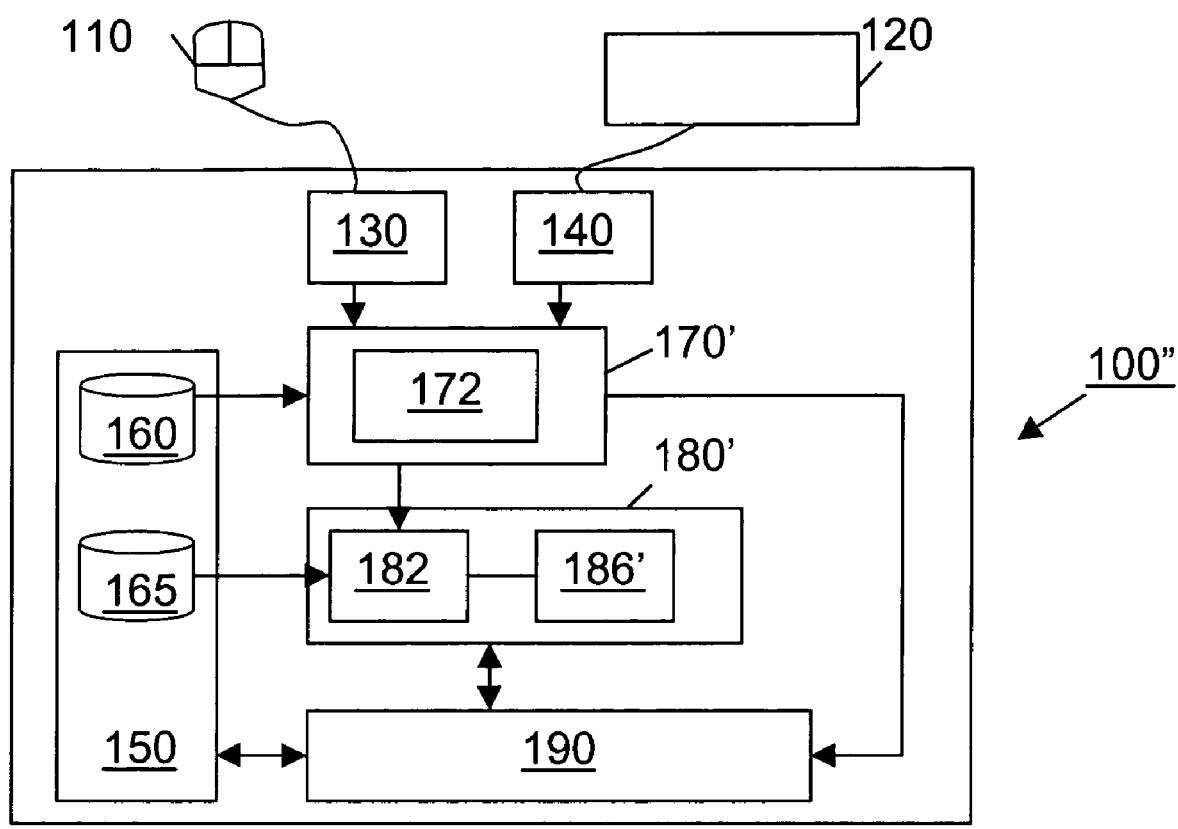
FIG. 4 represents components of a device, according to an alternative to the embodiments of FIGS. 2 and 3.
Figure 5:
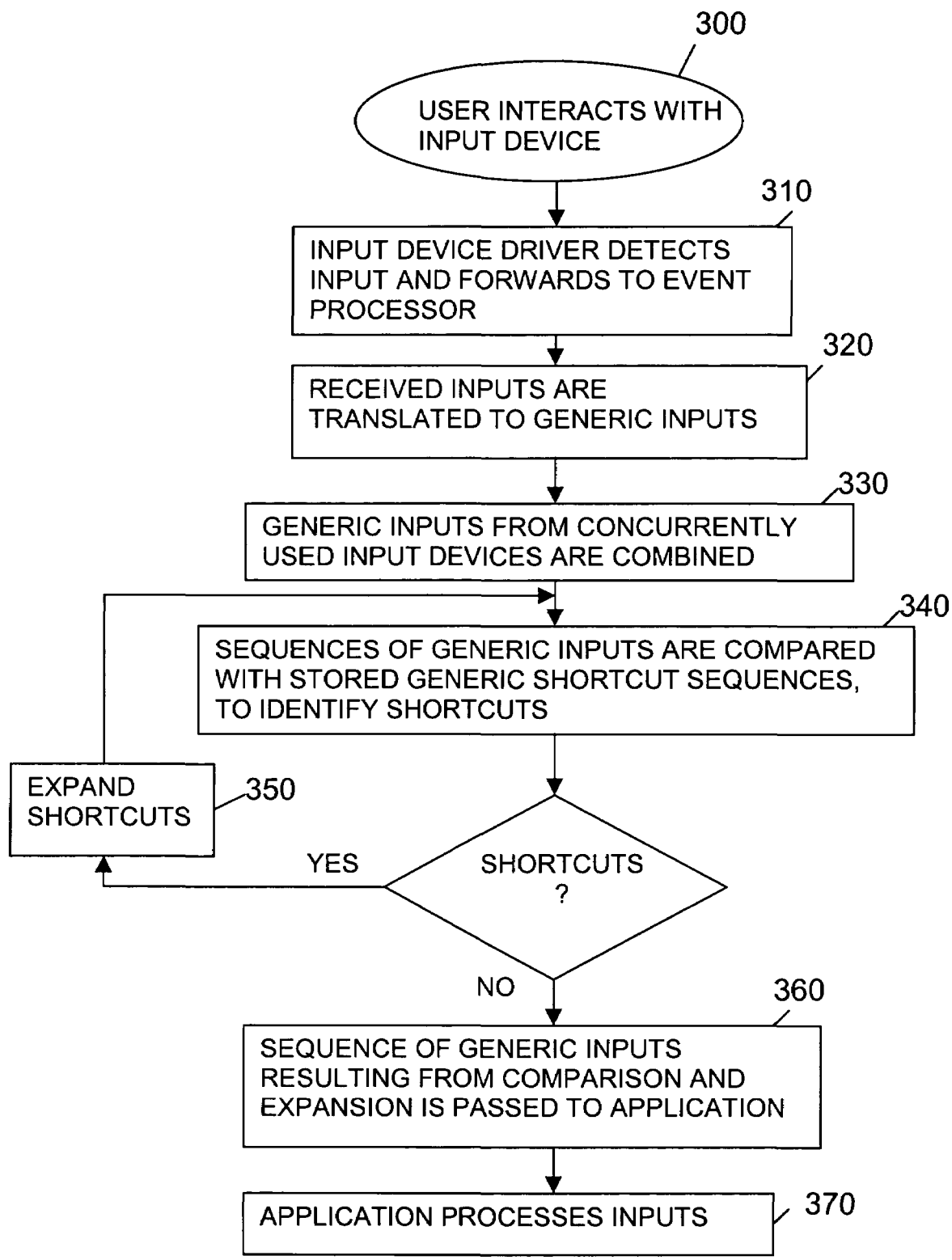
FIG. 5 shows a sequence of operational steps performed during run-time user interaction with an application program, according to an embodiment of the invention.

Described below with reference to FIG. 5 are methods for supporting generic shortcuts that are applicable across different device types. Also described with reference to FIGS. 2, 3 and 4 are data processing apparatuses implementing support for translation between device-type-specific inputs and generic inputs, and implementing support for comparisons between detected sequences of generic inputs and stored generic shortcut sequences. The methods and apparatuses described below enable initiation of a required operation in response to shortcut user interaction sequences on the various input devices, without having to implement multiple device-type-specific shortcuts within the application program code.

A generic programming model, such as XForms, can be extended by defining a set of generic inputs that are typically generalizations of input-device-specific inputs. The W3C's 'XForms 1.0' specification describes device-independent event processing and lists various events that can be generalized and for which generic shortcuts can be defined according to the invention. For example, virtual keys such as 'generic:A' to 'generic:Z' may be defined, as well as markers such as 'generic:Ctrl', 'generic:Alt' and 'generic:F1'. These generic inputs are abstractions that do not require input devices to physically have these virtual keys and markers on their user interface. The generalized representations of specific input events can be included in an application program without changing the structure of the application program.

Shortcut sequences can then be defined using the generic inputs—providing a set of generic shortcuts that each represent a request for an action or application navigation sequence. For example, a generic shortcut sequence such as 'generic:Ctrl-generic:X' may be defined to initiate closing of an application equivalent to the application navigation sequence 'Menu:File-MenuItem:Exit'. The application program may be coded to respond directly to the generic shortcut sequence to initiate a required operation. Alternatively, there may be an intermediate step of mapping the generic shortcut sequence to a longer sequence of generic inputs, the application program then performing an action or navigation sequence in response to the longer sequence of generic inputs.

Each generic input key or marker and each generic shortcut sequence can then be mapped to a specific user interaction event or sequence for each input device type that the application developer, device manufacturer or other entities wish to have supported. According to specific device capabilities, several different user interaction sequences may be mapped to a single generic shortcut sequence. For example 'generic: Ctrl' may be mapped to <stroke> on a Personal Digital Assistant (PDA) device and 'generic:X' mapped to virtual key X. Then the example shortcut sequence 'generic:Ctrl-generic:X' (mentioned above) maps to '<stroke>-X' on the PDA. The application elements displayed on the PDA's display screen are unchanged from conventional application views (for example Menu, MenuItem).

A device-type-specific event translator is provided for each type of data processing device to be supported. The event translator translates received inputs into generic inputs, based on a stored set of mappings. The result of this translation is a sequence of generic inputs. In one embodiment, the event translator forms part of an event processor. The event processor also comprises a shortcut identifier for identifying generic input sequences by comparing translated sequences of generic inputs with a database of defined shortcut sequences. The shortcut sequences in the database are sequences of generic input units and are each stored in association with a corresponding expanded sequence of generic inputs. The expanded sequence of generic inputs is passed to the application program, initiating the corresponding application operations.

In an alternative embodiment, an application program performs the comparison of the generated sequences of generic inputs and, when a generic shortcut sequence is identified within the sequence of generic inputs, the application initiates the relevant defined operation.

FIG. 2 is a schematic representation of a data processing apparatus 100, including first and second input devices 110, 120 and corresponding device-type-specific device drivers 130, 140 for receiving inputs from the input devices. A data storage unit 150 within the apparatus holds a database 160 of shortcut sequences. Also installed on the apparatus are an event processor program 170, at least one application program 180 and operating system software 190. The event processor 170 includes a translator 172 for translating device-specific inputs into generic inputs, and a shortcut identifier 174. The shortcut identifier 174 identifies generic shortcut sequences by performing comparisons between the translated sequences of generic inputs and stored generic shortcut sequences. The event processor 170 may also include a shortcut expander component 176 for replacing an identified generic shortcut sequence with a corresponding longer sequence of generic inputs (i.e. expanding the shortcut sequence). Other applications may be running on computer systems elsewhere in the network. In the embodiment of FIG. 2, the event processor 170 is a pre-processor component separate from the application program 180, taking device-specific inputs from the device drivers 130, 140 and outputting translated and expanded sequences of generic inputs. A single pre-processor 170 may be used with a plurality of applications 180.

As described in more detail below with reference to FIG. 5, the event processor 170 receives inputs from respective input device drivers 130, 140 and translates 320 each input event or a set of inputs into a generic input unit or sequence. This involves applying a set of translation rules to the received inputs (potentially translating all inputs that could correspond to an application navigation event or action). There may be a separate event processor for translating inputs for each supported type of input device, or a plurality of input device drivers may provide their input streams to a common event processor that integrates translation functions and translation rule sets for a plurality of input device types.

Figure 3A:
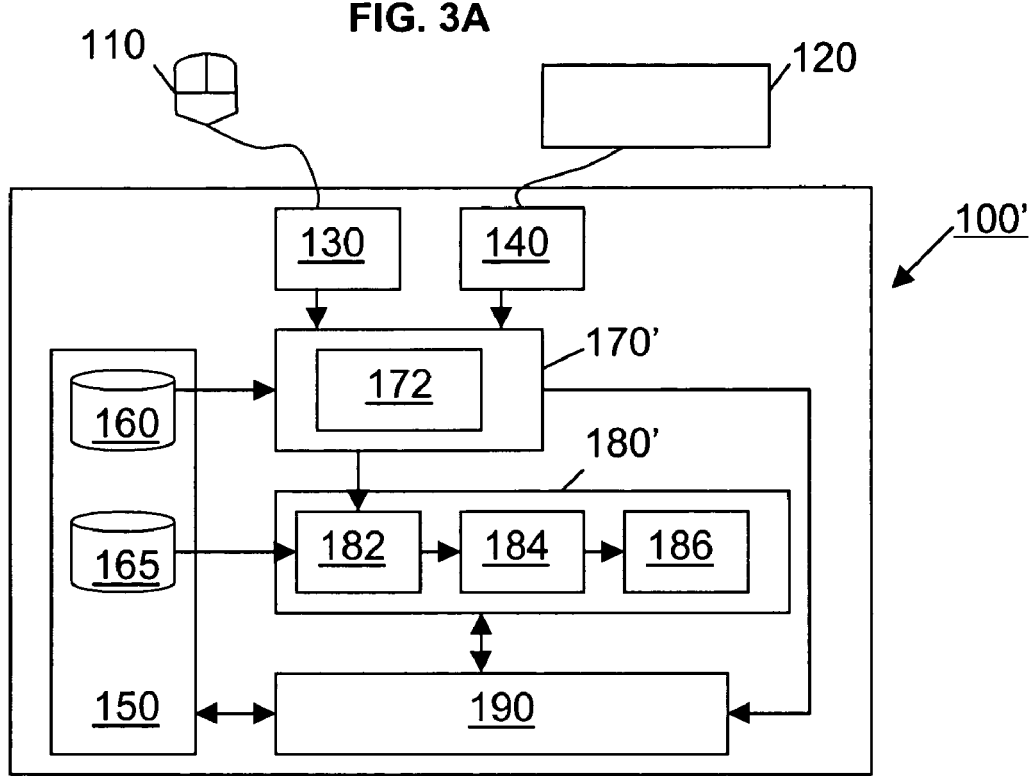
FIGS. 3A and 3B represent components of a device, according to an alternative to the embodiment of FIG. 2.
Figure 3B:
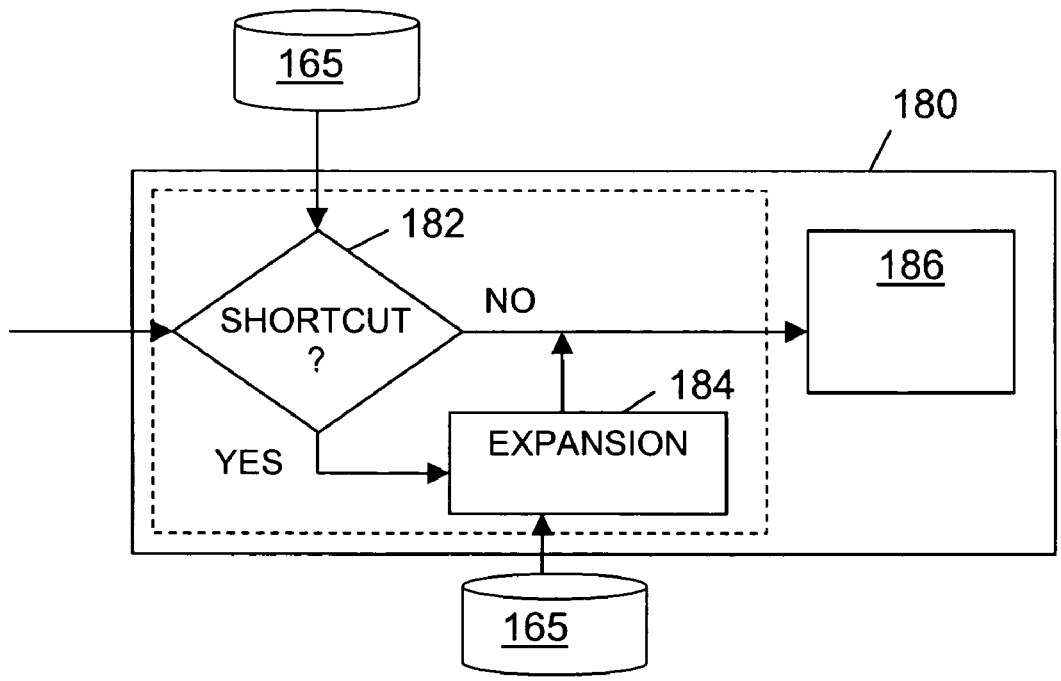

FIGS. 3A-3B and 4 represent alternative embodiments to FIG. 2. As shown in FIG. 3A, an apparatus 100' according to one embodiment of the invention provides a pre-processor program 170' implementing the translator 172 but implements a shortcut identifier 182 and shortcut expander 184 within the application program 180'. The translator receives inputs from the input devices 110,120, applies the mappings in database 160 to the received device-specific inputs and outputs generic inputs. The application program accesses a database 165 of generic shortcut sequences and the shortcut identifier 182 performs comparisons to identify shortcuts matching the translated inputs. The shortcut expander 184 then replaces the identified matching shortcuts with longer sequences of generic inputs and passes the expanded generic input sequence to the main application routine 186 for processing. The flow of processing within the application 180 of FIG. 3A is represented in FIG. 3B. After the shortcut identifier 182 determines whether a shortcut is present in the sequence of generic inputs, shortcut sequences are expanded by the shortcut expander 184 and replace the shortcut sequence in the correct position in the stream of inputs. If no shortcut is identified, the stream of generic inputs output by the translator 172 is passed to the main application routine 186 without further modification.

FIG. 4 represents an apparatus 100" according to an alternative embodiment in which the application program's main application routine 186' has been developed to respond directly to a generic shortcut sequence identified by the shortcut identifier 182—without the need for expansion of the shortcut by a separate shortcut expander.

In another embodiment of the invention, the application programs, a generic shortcut identifier and the database of generic shortcut sequences may be implemented on an application server system remote from the data processing apparatus that includes the input device. In such an implementation, sequences of device-type-specific inputs are received by local device drivers and either translated and then forwarded to the remote system for processing, or forwarded in their received device-type-specific format.

Described below with reference to FIG. 5 is a sequence of operational steps according to one embodiment of the invention, performed during user interaction with an application program.

As represented in FIG. 5, a user interacts 300 with an input device 110,120 associated with a local data processing apparatus 100 to initiate operations of an application program 180. The application may be running on the local apparatus 100 or, as shown in FIG. 1, a local client program 200 may be communicating with a remote application server 210 that runs a number of applications 180.

Each user interaction is detected 310 by an input-device-specific device driver 130,140 on the local apparatus. The input device driver receives a sequence of input-device-type-specific inputs corresponding to the user's interactions (pressing mouse buttons or keyboard keys, pen-type device strokes, voice menu selection events by speaking certain words or phrases, etc). Some interactions, such as mouse movement without button depressions or background noise detected by a microphone that is not recognized as an input word, are not considered input events for the purposes of this specification. The input device driver passes 310 each input to an event processor 170.

The individual inputs (such as each key press event) received by the local apparatus are each mapped 320 to a respective 'generic input' that is typically a generalized representation of the received input-device-type-specific input. A translator component 172 compares the received inputs with a database of receivable inputs and their respective mappings, to identify the required mapping, and then applies 320 the identified mapping to translate the received inputs to generic inputs. In this embodiment, the translator is implemented within a pre-processor program 170, which may be device-type-specific or applicable to a plurality of input devices. In the case of a pre-processor that is applicable to multiple devices, the pre-processor program is associated with and has access to a repository 160 of device-type-specific mappings. The translation step 320 generates a sequence of generic inputs corresponding to the sequence of received inputs.

The mapping or translation between device-type-specific inputs and generic inputs is generally performed separately for each input event. However, an input event unit to which the translation step is applied may comprise a sequence of inputs that together correspond to a single generic input or a sequence or generic inputs.

If multiple input devices attached to the same data processing device are used concurrently (and their respective input events overlap or are within a short time period of each other), generic inputs corresponding to identified device-specific inputs of a plurality of input devices may be combined 330 in a sequence of generic inputs. Examples are set out below.

The generated sequence of generic inputs is then compared 340 with a set of generic shortcut sequences stored in a database, each generic shortcut sequence within the set of stored generic shortcut sequences having been defined to represent a particular application navigation sequence or action. This comparison identifies any application navigation sequences or actions corresponding to the translated generic input sequences.

The comparison typically looks for specific sequences of generic input units that are defined and stored to match application navigation sequences. However, the database may define actions or navigation sequences for a single generic input that maps to a sequence of user inputs (such as 'Ctrl-Alt-Delete' and the concurrently spoken word 'Shutdown' mapping to 'generic:Shutdown' as described below).

Where a sequence of generic inputs corresponding to a received input sequence is identified as a generic shortcut sequence corresponding to an application navigation sequence or action, the generic shortcut sequence may be expanded 350 by replacing the shortcut sequence with a corresponding longer sequence of generic inputs.

The expanded sequence of generic inputs is then passed 360 to the main application processing routine, and the application then initiates 370 the desired application navigation sequence or actions.

Referring to the above description of step 330 of FIG. 5, a first example shortcut for closing an application may comprise pressing a 'Ctrl' key on a keyboard while speaking the word 'Exit' into a microphone. In this example, the 'Ctrl' key depression is detected by keyboard driver software and mapped by a keyboard-specific event processor to the generic input unit 'generic:Ctrl'. Similarly, an event processor connected to receive input from the microphone maps the spoken word 'Exit' to the generic input unit 'generic:X'. The combination of input events from the different input devices is now represented as the generic sequence 'generic:Ctrl-generic:X'. This sequence is compared with a stored set of generic shortcut sequences and a match is identified, since 'generic:Ctrl-generic:X' is defined to represent the application navigation sequence 'Menu:File-MenuItem:Exit'. Since the combined input is recognised as a shortcut sequence for the Exit operation, the Exit operation is initiated.

As another example, an immediate system shutdown may be achievable by simultaneous depression of the 'Ctrl', 'Alt' and 'Delete' keyboard keys and speaking a word such as 'shutdown'. In this example, 'Ctrl-Alt-Delete' is a well known shortcut sequence for terminating an application task, or rebooting the operating system, in a Windows™ environment. In some Windows operating systems, 'Ctrl-Alt-Delete' prompts the operating system to display a status list of programs that are currently running, allowing the user to terminate any of them, to shutdown or restart the operating system, and so on. Given that the 'Ctrl-Alt-Delete' keys have been pressed, the spoken word 'Shutdown' is converted to generic input 'generic:Shutdown'. This is equivalent to selecting from the set of options normally available following 'Ctrl-Alt-Delete'. 'Ctrl-Alt-Delete' may be converted to 'generic:TerminateOptions'. Note that alternative user navigation paths may exist for a single operation—in this case the alternative is to use the mouse to select 'Start' from the Windows desktop, then to select 'Shutdown', then select 'Shut down the computer'.

Referring to steps 340 and 350 of FIG. 5, as described above, an example match-and-expand routine is described below in more detail. The routine includes Expand( ), FindInputFragment( ) and Merge( ) subroutines. Pseudocode for the Expand( ) subroutine is given below. Multiple standard implementations are possible for FindInputFragment( ) and Merge( ), and so these subroutines are not described in detail below. Shortcuts may be nested, such that when a shortcut sequence is expanded, the expanded sequence still includes a shortcut. In the example routine set out below, if shortcuts are nested, an expanded sequence of generic inputs is compared once again with stored shortcut sequences. Thus, any embedded shortcuts are also detected and can be expanded. This process repeats until the resulting generic input sequence cannot be expanded any further.

Pseudocode for Match-and-Expand Routine:

```
Match-and-Expand-Shortcuts(generic-input-stream) {
    While there is some expansion
        For some generic-input-fragment in generic-input-stream found
        by
        Find-input-fragment( )
            expanded-fragment = Expand(generic-input-fragment)
            If(expanded-fragment is different from generic-input-
            fragment)
                generic-input-stream = Merge(Expanded-fragment,
                                              generic-input-stream)
                Record expansion
            end-if
        end-for
            // If expanded at least once, try now with modified
            input stream
            // Goes to Step 1.
    end-while
}
// Expand if the input fragment matches a known shortcut, otherwise
return input
// fragment as-is
Expand-Shortcuts(generic-input-fragment) {
    If generic-input-fragment matches any known shortcut,
```

-continued

```
            expanded-fragment = Expand(generic-input-fragment)
            Return expanded-fragment
    Else
            Return generic-input-fragment
    End-if
}
```

The operational steps 300-360 above may be implemented to control an application running on a data processing system which is local to the input device or set of input devices currently being used (mouse, keyboard, microphone, etc). Alternatively, these steps may be implemented in a distributed solution in which steps 300 and 310 are performed locally but subsequent steps are performed remote from the client device. In another alternative, steps 300-330 may be performed locally with steps 340-370 performed on a remote application server to which multiple different types of client apparatus can connect.

Figure 6:
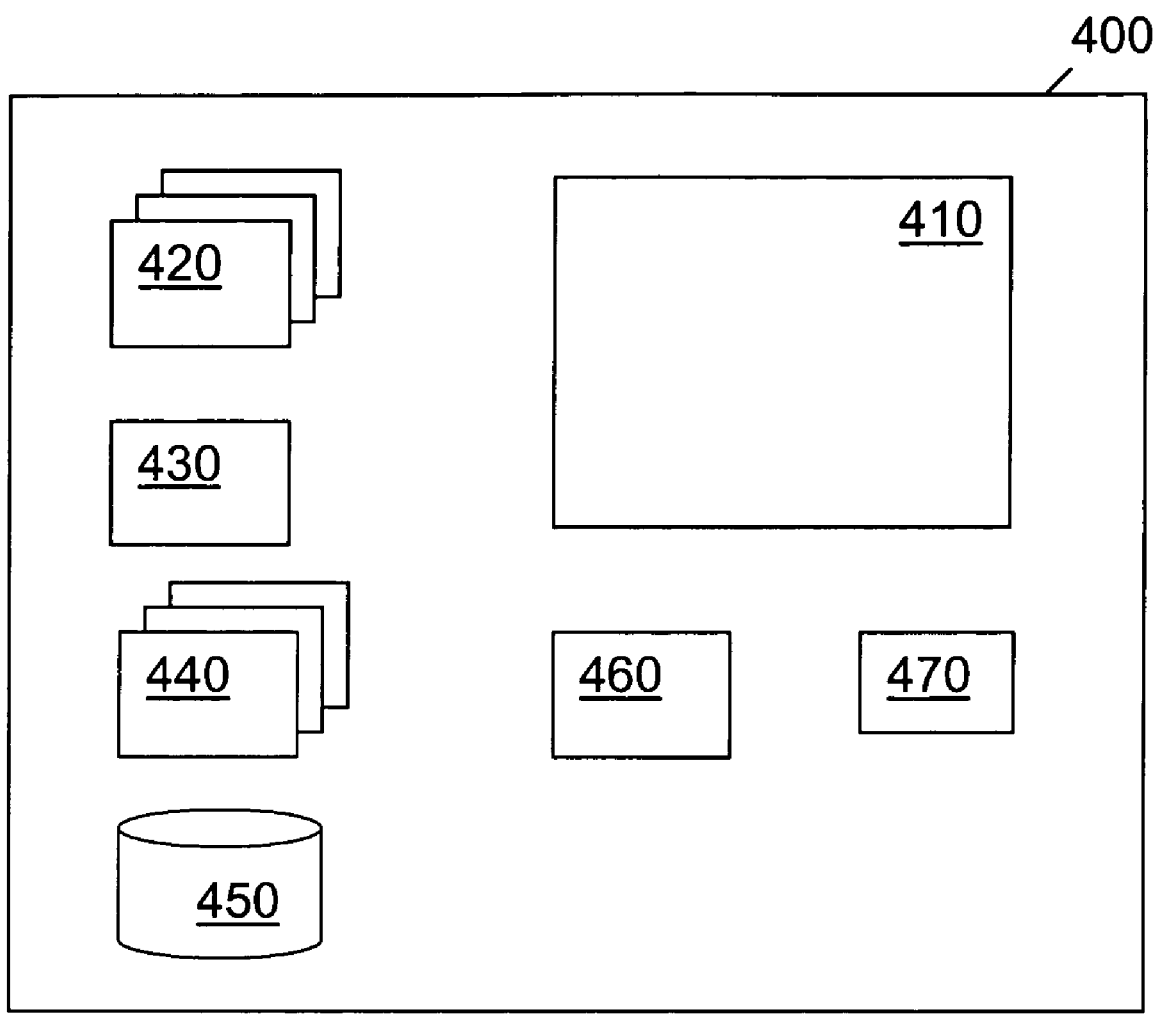
FIG. 6 shows components of a software development toolkit for developing computer programs that support generic input sequences.

FIG. 6 represents a set of components of an application development toolkit 400 for the development of application programs with support for generic shortcut sequences. A software development toolkit for developing application programs with generic shortcuts comprises a development environment 410 and a set of software modules for input detection and pre-processing. The toolkit comprises the following components:

A set of device drivers 420 for standard input devices. Users or system administrators are typically able to make use of device drivers pre-installed on their apparatus for some input devices, and device drivers are commonly available for installation to add support for other input devices as required. Therefore, the set of device drivers is not an essential feature of the toolkit.

An online application programmers guide 430 providing a notation for specifying generic input sequences and generic shortcuts—including a specification for mappings between generic shortcut sequences and application operations (or between shortcut sequences and sequences of generic inputs that are interpretable by the computer program as a specific operation initiation sequence) and a specification for mappings between device-type-specific inputs and generic input units.

A set of device-type-specific translators 440 for translating device-type-specific inputs to generic input units; and/or a single translator for applying a selected set of a plurality of sets of translation mappings, to support generation of generic input sequences from a plurality of different input devices.

A database 450 for storing tuples that are defined as generic shortcuts, and for storing mappings between receivable device-specific inputs and generic input units.

An event processor 460 for processing sequences of generic inputs, including a shortcut identifier and program code for invoking well-defined APIs when a defined shortcut sequence is recognized. The event processor may include the translator(s) and instances of the event processor may be adapted for use with different applications.

An application development environment 410, providing a developer's workspace with a link mechanism for accessing and instantiating the translators, event processors and databases of the toolkit.

Glue code 470 or other elements of a run-time environment (such as a Java Virtual Machine) for invoking operations of the application at run-time.

A toolkit for developing applications according to the invention may implement a selected subset of the components listed above.

What is claimed is:

1. A computer-implemented method of supporting shortcuts from a variety of input device-types to an application program, said method comprising a data processor:

inputting, by a user, a first input sequence from a first input device-type and a second input sequence from a second input device-type to a generic application model, in a platform-independent language, that communicates with said application program,
  wherein said first input device-type is one of a microphone, a mouse, a keypad, and a keyboard, and
  wherein said second device-type is a device-type other than said first input device-type;
 translating, by said generic application model, said first input sequence and said second input sequence into corresponding sequences of generic inputs;
 comparing said corresponding sequences of generic inputs to a stored set of generic shortcut sequences to identify a match,
  wherein said corresponding sequences of generic inputs, translated from said first input sequence and said second input sequence, are mapped to a single generic shortcut sequence, and
  wherein each of said stored set of generic shortcut sequences corresponds to an initiation sequence for initiating an operation of said application program; and
 upon matching one of said set of generic shortcut sequences, initiating said initiation sequence for a corresponding operation of said application program.

2. The method of claim 1, wherein upon identifying said generic shortcut sequence, said generic shortcut sequence is expanded to comprise an expanded sequence of generic inputs corresponding to an expanded generic shortcut sequence, and said expanded generic shortcut sequence initiates an initiation sequence for a corresponding operation of said application program.

3. A data processing system that supports shortcuts from a variety of input device-types to an application program, said system comprising:

a first input device-type and a second input device-type,
  wherein said first input device-type is one of a microphone, a mouse, a keypad, and a keyboard, and
  wherein said second device-type is a device-type other than said first input device-type;
 a data processor that:
 receives, from a user, a first input sequence from said first input device-type and a second input sequence from said second input device-type;
 sends said first input sequence and said second input sequence to a generic application model, in a platform-independent language, that communicates with said application program;
 translates, by said generic application model, said first input sequence and said second input sequence into corresponding sequences of generic inputs;
 compares said corresponding sequences of generic inputs to a stored set of generic shortcut sequences to identify a match,
  wherein said corresponding sequences of generic inputs, translated from said first input sequence and said second input sequence, are mapped to a single generic shortcut sequence, and wherein each of said stored set of generic shortcut sequences corresponds to an initiation sequence for initiating an operation of said application program; and upon matching one of said set of generic shortcut sequences, initiates said initiation sequence for a corresponding operation of said application program.

4. The system of claim 3, wherein upon identifying said generic shortcut sequence, said generic shortcut sequence is expanded to comprise an expanded sequence of generic inputs corresponding to an expanded generic shortcut sequence, and said expanded generic shortcut sequence initiates an initiation sequence for a corresponding operation of said application program.

5. A computer program storage medium readable by computer, tangibly embodying a program of instructions executable by said computer to perform a computer-implemented method for implementing generic shortcut support to an application by inputs from at least two device-type-specific inputs, said method comprising:

inputting, by a user, a first input sequence from a first input device-type and a second input sequence from a second input device-type to a generic application model, in a platform-independent language, that communicates with said application program, wherein said first input device-type is one of a microphone, a mouse, a keypad, and a keyboard, and wherein said second device-type is a device-type other than said first input device-type;

translating, by said generic application model, said first input sequence and said second input sequence into corresponding sequences of generic inputs;

comparing said corresponding sequences of generic inputs to a stored set of generic shortcut sequences to identify a match, wherein said corresponding sequences of generic inputs, translated from said first input sequence and said second input sequence, are mapped to a single generic shortcut sequence, and wherein each of said stored set of generic shortcut sequences corresponds to an initiation sequence for initiating an operation of said application program; and upon matching one of said set of generic shortcut sequences, initiating said initiation sequence for a corresponding operation of said application program.

6. The computer program storage medium of claim 5, wherein upon identifying said generic shortcut sequence, said generic shortcut sequence is expanded to comprise an expanded sequence of generic inputs corresponding to an expanded generic shortcut sequence, and said expanded generic shortcut sequence initiates an initiation sequence for a corresponding operation of said application program.

* * * * *